R. PATTISON.
ICE TONGS.
APPLICATION FILED SEPT. 11, 1913.

1,114,179.

Patented Oct. 20, 1914.

Witnesses:
Charles C. Abbe
M. Carmody

Inventor
Richard Pattison.
By his Attorney
W. T. Criswell

UNITED STATES PATENT OFFICE.

RICHARD PATTISON, OF NEW YORK, N. Y.

ICE-TONGS.

1,114,179.  Specification of Letters Patent.  Patented Oct. 20, 1914.

Application filed September 11, 1913. Serial No. 789,304.

*To all whom it may concern:*

Be it known that I, RICHARD PATTISON, a citizen of the United States, and a resident of New York, borough of Brooklyn, county of Kings, and State of New York, have invented a certain new and useful Improvement in Ice-Tongs, of which the following is a full, clear, and exact specification.

This invention relates to a class of devices adapted to be used for carrying ice from place to place.

My invention has for its object primarily to provide a form of ice tongs designed to be used especially as a household article for permitting pieces of ice to be conveniently carried, and wherein is employed two companion jaws which are hingedly movable upon a single pivot so as to be swung in unison relatively to and from each other, each jaw being composed of two spaced corresponding gripping members, or prongs disposed in opposed relation for being adapted to engage the ice in a manner to prevent it from swinging so that the ice may be readily raised to an elevation for placing it in a refrigerator, or the like, thus overcoming the objections incident to the use of this class of devices having single separate prongs.

Another object of the invention is to provide a detachable supporting element adapted to enable the ice to be supported by one hand of a person while being directed by the other hand to its resting place; and still a further object of the invention is to provide a form of ice tongs which are susceptible of being made of wire if desired so as to be sold at a very moderate price.

A practical embodiment of the invention is represented in the accompanying drawing forming a part of this specification in which similar characters of reference indicate corresponding parts in all the views, the said invention being more fully described hereinafter, and then pointed out in the claims at the end of the description.

Figure 1:
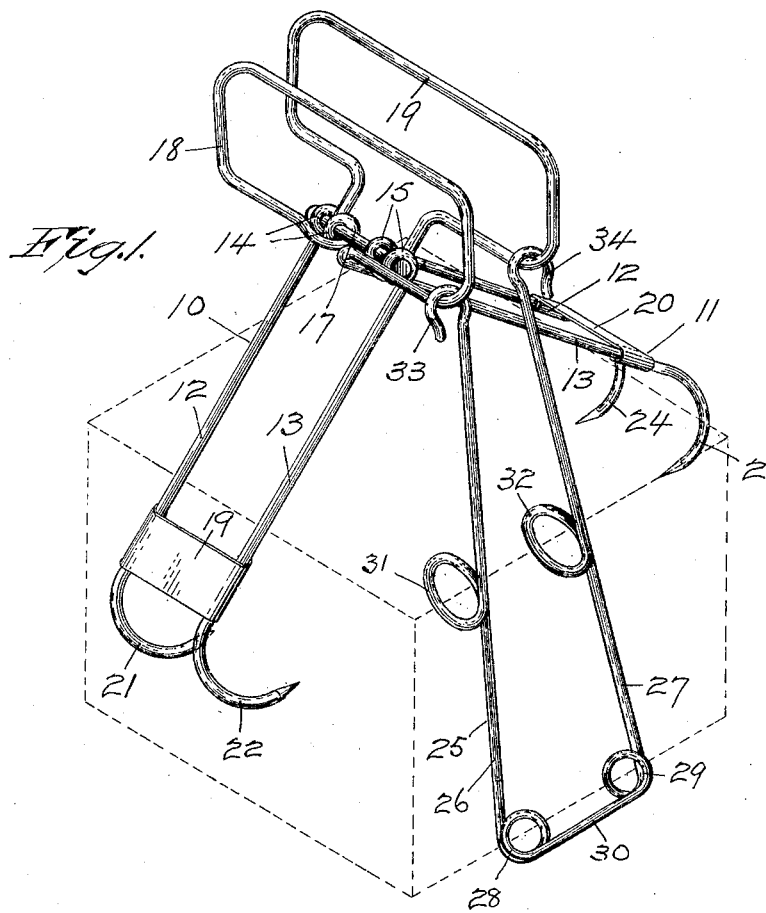
Figure 2:
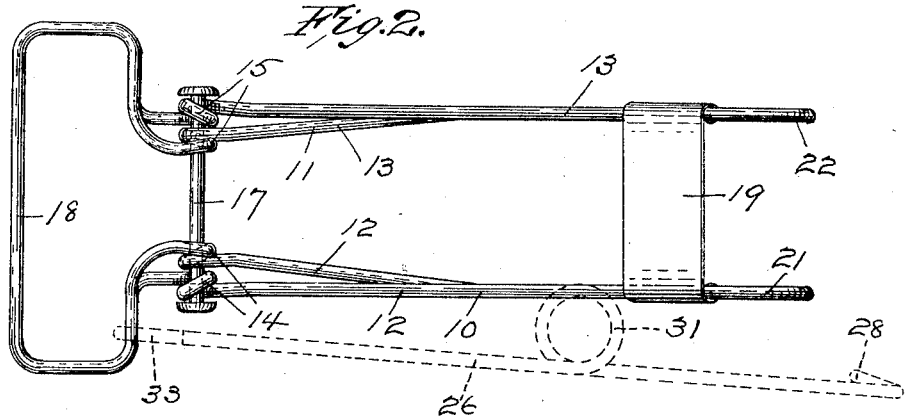

In the drawing, Figure 1 is a perspective view of one form of the device embodying my invention as used to support a piece of ice, and Fig. 2 is a side view of the device.

The ice tongs have companion jaws 10 and 11 which are preferably made of wire so as to be simply and cheaply constructed, and each jaw has two spaced rods, or arms, as 12 and 13. The upper ends of the arms of each of the jaws 10 and 11 are coiled to provide eyes 14 and 15, and the eyes of the arms of one of the jaws are disposed between the eyes of the second jaw so that all of the eyes are in register for passage therethrough of a pin 17 which serves as a common pivot for both of the jaws. The arms 12 and 13 of the jaws are disposed on similar inclines in opposite directions relatively to the pin 17 whereby the jaws may be hingedly swung in unison to and from each other.

The arms 12 and 13 of each of the jaws 10 and 11 extend some distance above the eyes 14 and 15, and integrally formed upon the upper ends of each pair of said arms is a handle as 18 and 19. Both of the handles 18 and 19 are disposed in upward directions approximately vertically with relation to the inclined arms 12 and 13 so as to be spaced apart, and in order to permit the handles to be firmly grasped by the hands of a person, each handle is formed by bending the arms 12 and 13 to provide substantially rectangular shaped loops extending transversely with respect to the arms.

The lower portions of each pair of the arms 12 and 13 of each jaw are connected by a transverse bar, or plate, as 19 and 20, or the plates may be dispensed with and the arms connected by any other suitable means to prevent the arms from lateral movement when the tongs are in use, and integrally formed upon the lower ends of the arms are engaging members, or prongs 21, 22, 23, 24, the free end of each of which is pointed, as shown. The prongs 21 and 22 of the arms of one of the jaws are curved inwardly, and the prongs 23 and 24 are likewise curved inwardly so as to be in opposed relation to the prongs 21 and 22. To use the device as thus formed the handles 18 and 19 are moved in opposite directions, and each pair of the arms of the jaws as well as each pair of the prongs 21, 22 and 23, 24 will also be swung in opposite directions to each other. The prongs and the arms may then be guided over a piece of ice, and by reversely moving the handles of the jaws 10 and 11 all of the prongs will be forced into engagement with the ice in a manner to prevent it from swinging when being carried as is incident to ice tongs ordinarily in use.

Serving to permit the ice to be supported by one hand of a person while being held by forcing the handles 18 and 19 toward each other by the other hand, I provide a detachable substantially U-shaped supporting element, as 25. The supporting element 25 is preferably made of wire which is bent to provide two spaced side arms 26 and 27 having the lower ends thereof coiled at 28 and 29 and then formed to provide a transverse bar 30. The central parts of the side arms 26 and 27 are also coiled to provide rings, as 31 and 32, which extend in similar directions laterally with respect to the arms. Upon the free ends of the side arms 26 and 27 are hooks 33 and 34 one of which is guided over a part of each of the handles 18 and 19 of the device so as to be suspended therefrom. When a piece of ice is being carried by the tongs proper, as above explained, the supporting element 25 is moved against the underneath surface of the ice. By tightly holding the handles 18 and 19 with one hand and gripping the rings 31 and 32 of the supporting element with the other hand the ice may be readily lifted and placed in position as occasion requires as well as avoiding contact of the hands with the ice.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a device of the character described, two companion jaws, each having two arms, the arms of each jaw being disposed on inclines in opposite directions, and the upper portions of all of said arms being hingedly movable upon a common pivot, two handles, one provided upon the upper ends of each pair of the arms above their pivots, and said handles being spaced apart, four spaced gripping members, one extending from the lower end of each of the arms, and all of said gripping members being disposed so that the free ends of each pair are in opposed relation to tightly engage an article when the handles are forced toward each other to guide the jaws in similar directions or to free the gripping members from engagement with the article when the handles are reversely directed to swing the jaws outwardly with relation to each other, and a substantially U-shaped supporting element detachably held to the handles, and suspended therefrom whereby the article may be supported by one hand of a person while said handles are grasped by the other hand.

2. In a device of the character described, two companion jaws, each having two arms, the arms of each jaw being disposed on inclines in opposite directions, and the upper portions of all of said arms having registered eyes through which is passed a bolt for pivoting the arms thereon, two substantially rectangular handles, one provided upon the upper ends of each pair of the arms above their pivots and said handles being spaced apart, means connecting the lower parts of each pair of the arms, and four spaced prongs, one extending from the lower end of each of the arms, and all of said prongs being disposed so that the free ends of each pair are in opposed relation to tightly engage an article when the handles are forced toward each other to guide the jaws in similar directions or to free the prongs from engagement with the article when the handles are reversely directed to swing the jaws outwardly with relation to each other, and a substantially U-shaped supporting element detachably held to the handles, and suspended therefrom, and each arm having a ring provided thereon whereby the article may be supported by one hand of a person while said handles are grasped by the other hand.

This specification signed and witnessed this tenth day of September A. D. 1913.

RICHARD PATTISON.

Witnesses:
ROBT. B. ABBOTT,
M. DERMODY.

Copies of this patent may be obtained for five cents each, by addressing the "Commissioner of Patents, Washington, D. C."